(12) United States Patent
Locklear et al.

(10) Patent No.: US 10,221,254 B2
(45) Date of Patent: Mar. 5, 2019

(54) CLOSED REACTOR TRANSITIONS BETWEEN METALLOCENE CATALYSTS

(71) Applicant: Univation Technologies, LLC, Houston, TX (US)

(72) Inventors: Brandon C. Locklear, Houston, TX (US); R. Eric Pequeno, Baytown, TX (US); Richard B. Pannell, Kingwood, TX (US); Fathi David Hussein, Hilton Head Island, SC (US); Rich John Stolz, Baytown, TX (US); William A. Matthews, Hilton Head Island, SC (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 15/564,456

(22) PCT Filed: Apr. 6, 2016

(86) PCT No.: PCT/US2016/026201
§ 371 (c)(1),
(2) Date: Oct. 5, 2017

(87) PCT Pub. No.: WO2016/164451
PCT Pub. Date: Oct. 13, 2016

(65) Prior Publication Data
US 2018/0079836 A1    Mar. 22, 2018

Related U.S. Application Data

(60) Provisional application No. 62/144,587, filed on Apr. 8, 2015.

(51) Int. Cl.
C08F 2/34 (2006.01)
C08F 2/38 (2006.01)
(Continued)

(52) U.S. Cl.
CPC ............... *C08F 2/34* (2013.01); *B01J 8/1872* (2013.01); *C08F 2/38* (2013.01); *C08F 4/65927* (2013.01);
(Continued)

(58) Field of Classification Search
CPC .... C08F 2/001; C08F 2/34; C08F 2/38; C08F 4/6592
See application file for complete search history.

(56) References Cited

U.S. PATENT DOCUMENTS 8,598,283 B2  12/2013  Markel et al.
2004/0138391 A1  7/2004  Burdett et al.
(Continued)

FOREIGN PATENT DOCUMENTS

EP          0811638         12/1997

OTHER PUBLICATIONS

International Search Report & Written Opinion for related PCT Application PCT/US2016/026201, dated Jul. 14, 2016 (11 pgs).
(Continued)

*Primary Examiner* — Caixia Lu
(74) *Attorney, Agent, or Firm* — Brooks, Cameron & Huebsch, PLLC (57) ABSTRACT

A method for transitioning a gas phase polymerization reactor between metallocene catalysts is provided. The method comprises first reducing the superficial gas velocity and increasing the height of the fluidized bed within the reactor prior to stopping a feed comprising a first metallocene catalyst. The method further comprises introducing a first polymerization neutralizer to the reactor, wherein the first polymerization reactor does not comprise water, and then introducing a second polymerization neutralizer to the reactor, wherein the second polymerization neutralizer is different from the first polymerization neutralizer. After this,
(Continued)

the method comprises purging the reactor with an inert gas and then introducing a feed comprising a second metallocene catalyst to the reactor.

20 Claims, 1 Drawing Sheet

(51) Int. Cl.
    *C08F 10/00*     (2006.01)
    *C08F 4/6592*     (2006.01)
    *C08F 110/02*     (2006.01)
    *B01J 8/18*     (2006.01)
    *C08F 4/659*     (2006.01)

(52) U.S. Cl.
    CPC ........ *C08F 110/02* (2013.01); *C08F 4/65916* (2013.01)

(56) References Cited

U.S. PATENT DOCUMENTS

| | | | |
|---|---|---|---|
| 2004/0167299 A1 | 8/2004 | Savatsky et al. | |
| 2005/0282978 A1 | 12/2005 | Agapiou et al. | |
| 2013/0046070 A1* | 2/2013 | Chamayou | C08F 10/00 526/348.5 |

OTHER PUBLICATIONS

International Preliminary Report on Patentability for related PCT Application PCT/US2016/026201, dated Oct. 19, 2017 (8 pgs).

\* cited by examiner

CLOSED REACTOR TRANSITIONS BETWEEN METALLOCENE CATALYSTS

This application is a National Stage Application under 35 U.S.C. § 371 of International Application Number PCT/US2016/026201, filed Apr. 6, 2016 and published as WO 2016/164451 on Oct. 13, 2016, which claims the benefit to U.S. Provisional Application 62/144,587, filed Apr. 8, 2015, the entire contents of which are incorporated herein by reference in its entirety.

FIELD OF THE INVENTION

This disclosure relates to methods for transitioning a gas phase polymerization reactor system from one metallocene catalyst to another metallocene catalyst.

BACKGROUND

In gas phase polymerization, a gaseous stream containing one or more monomers is passed through a fluidized bed under reactive conditions in the presence of a catalyst. A polymer product is withdrawn from the reactor. Fresh monomer is introduced to the reactor to replace the removed polymer product, and unreacted monomer is recycled back to the reactor. Process upsets in an ancillary system upstream and/or downstream of the reactor may require the polymerization to be shutdown or "killed." The use of multiple catalysts in the same reactor system may also require shutdowns, for example, to transition from one catalyst to another.

In the case of transitioning between catalysts, it is desirable to minimize the complexity and amount of time required for the transition and to minimize the amount of off-grade resin product produced. Many transition procedures are directed toward accomplishing these goals. However, typical kill procedures still often require the reactor to be opened, purged of hydrocarbons, emptied of polymer and catalyst particles, cleaned, and reloaded with the removed bed or a new bed to provide a "seedbed" of polymer. This process is time consuming, expensive, and allows impurities, such as moisture and air, to enter the reactor. Such impurities necessitate another time consuming procedure to remove.

WO 2004/060930 discloses a process for transitioning between a metallocene and a Ziegler-Natta polymerization catalyst system. The process requires discontinuing introduction of a metallocene catalyst, introducing a catalyst deactivating agent to stop the metallocene polymerization reaction, purging the reactor with an inert gas to remove unreacted deactivating agent, and then introducing a Ziegler-Natta catalyst to the reactor. US 2004/0138391 discloses a process for transitioning between catalyst systems that are incompatible with each other in a gas phase fluidized bed reactor containing a fluidized bed of polymer particles. The process requires continually passing monomer gases through the polymerization zone, discontinuing the introduction of a first catalyst system into the reactor, lowering the height of the bed of polymer particles, introducing a second catalyst system into the reactor, and then increasing the height of the bed of polymer particles. WO 2011/103280 provides a method for shutting down and restarting a gas phase polymerization reactor. The method involves introducing a polymerization neutralizer to stop polymerization. The method can also include stopping recovery of a polymer product from the reactor, stopping introduction of a catalyst and reactor feed to the reactor, and adjusting the pressure and superficial velocity of cycle fluid through the reactor from operating to idling levels.

Shutdown or transition procedures in gas phase polymerization reactors are often accompanied with a buildup of catalyst and polymer on the walls of the reactor, which is known as "sheeting." Another common problem is the buildup of catalyst and polymer on the internal distribution plate, injection nozzle(s), and/or product discharge nozzle(s), which is known as "plugging" or "plate fouling." Sheeting, fouling, and plugging can force a complete reactor shutdown for cleaning and removal of the polymer chunks, which could take several days. This undermines the efficiency of any process designed to minimize transition time.

It is particularly difficult to control sheeting, fouling, and plugging with metallocene catalysts during reactor shutdowns or transitions because they are known to exhibit unpredictable static tendencies. For instance, EP 0 811 638 describes metallocene catalysts as exhibiting sudden erratic static charge behavior that can appear even after long periods of stable behavior. It has been found that many of the known methods of shutting down or transitioning a reactor from one catalyst to another fail to prevent sheeting and the like with transitions between metallocene catalysts. There is a need for improved methods for transitioning a gas phase polymerization reactor system between metallocene catalysts.

SUMMARY

A method for transitioning a gas phase polymerization reactor comprising a fluidized bed from a first metallocene catalyst to a second metallocene catalyst is disclosed. The method comprises first reducing the superficial gas velocity and increasing the height of the fluidized bed within the reactor prior to stopping a feed comprising a first metallocene catalyst. The method further comprises introducing a first polymerization neutralizer to the reactor, wherein the first polymerization reactor does not comprise water, and then introducing a second polymerization neutralizer to the reactor, wherein the second polymerization neutralizer is different from the first polymerization neutralizer. After this, the method comprises purging the reactor with an inert gas and then introducing a feed comprising a second metallocene catalyst to the reactor.

The method disclosed herein is particularly useful with gas phase polyethylene polymerization reactors.

DETAILED DESCRIPTION

It has been found that metallocene catalysts are particularly sensitive to certain compounds typically used as catalyst kill agents or polymerization neutralizers (these terms are used interchangeably herein). For example, water is an extremely effective polymerization neutralizer for metallocene catalysts. However, it has been found that under certain circumstances when water is used as a polymerization neutralizer with metallocene catalysts during reactor transitions, the metallocene catalyst can interact with the water in a manner that causes severe and rapid sheeting in the reactor. This can potentially lead to a complete reactor shutdown so that the reactor can be opened and cleaned, which may take several days or more, and undermines any efficiency gained by having a fast transition process.

Due to these issues, there has been a tendency to avoid the use of water as a polymerization neutralizer in reactor transitions between metallocene catalysts. The tendency has been to look for and use other compounds. In some cases, those compounds may be less effective polymerization neutralizers than water. When the polymerization neutralizer that is used is less effective, it is possible that residual active metallocene catalyst may remain in the reactor during the reactor transition to a new metallocene catalyst. This can increase the amount of off-grade product that is produced during the transition and upon start up with the new catalyst. It can also increase the time required to complete a catalyst transition. As such, it is desirable to be able to use the most effective polymerization neutralizers available, so long as the compounds do not lead to other adverse effects on the reactor system or resin product.

The methods disclosed herein enable water to be used as a polymerization neutralizer with metallocene catalysts, while eliminating the risk that the metallocene catalyst will interact with the water and cause a catastrophic event. These methods can enable faster reactor transitions with less production of undesirable off-grade product.

The methods disclosed herein comprise first reducing the superficial gas velocity and increasing the height of the fluidized bed within the reactor prior to stopping a feed comprising a first metallocene catalyst. Next, a first polymerization neutralizer is added to the reactor. The first polymerization neutralizer does not comprise water, as it has been found that when the first polymerization neutralizer comprises water the risk of sheeting leading to a catastrophic event is substantially increased. The reactor is circulated for a period of time after introducing the first polymerization neutralizer to allow the reaction between the first polymerization neutralizer and the metallocene catalyst to take place. After this, a second polymerization neutralizer is introduced to the reactor. The second polymerization neutralizer is different from the first polymerization neutralizer, and may comprise water in a preferred method. The reactor is again circulated for a period of time after introducing the second polymerization neutralizer. Following this, the reactor is purged with an inert gas and then a feed comprising a second metallocene catalyst may be introduced to the reactor.

The total amount of polymerization neutralizer (the "total amount" meaning the amount of both the first and second polymerization neutralizer) added to the reactor should be sufficient to reduce or completely stop polymerization therein, without interrupting fluidization within the reactor. An excess amount of polymerization neutralizer, i.e. an amount greater than that necessary to stop polymerization can be used, but more preferably, the amount added is sufficient to reduce the rate of polymerization by about 90%, about 95%, about 98%, about 99%, about 99.9%, about 99.99%, about 99.999%, or 100%. A 99% reduction in the rate of polymerization means that polymerization is occurring at only 1% of the original rate of polymerization prior to the introduction of the polymerization neutralizer. A 100% reduction in the polymerization rate means that no polymerization is occurring within the reactor.

The total amount or concentration of the polymerization neutralizer within the reactor can vary depending on the size of the reactor and the desired time frame for the polymerization interruption. For example, the total amount or concentration of the polymerization neutralizer within the reactor can be at least 1 part per million by volume ("ppmv"), about 5 ppmv, about 10 ppmv, about 30 ppmv, about 50 ppmv, about 100 ppmv, about 250 ppmw, about 500 ppmw, or about 1,000 ppmw, based on the volume of the fluidized bed. In another example, the total amount or concentration of the polymerization neutralizer within the reactor can range from a low of about 1 ppmv, about 2 ppmv, or about 3 ppmv to a high of about 10 ppmv, about 30 ppmv, or about 50 ppmv, based on the volume of the fluidized bed.

The amount of the first polymerization neutralizer that is used may be represented on a ppm by weight basis. For example, the amount may be between 5 ppm and 1000 ppm, based on the weight of the fluidized bed. The amount may range from a low of 5 ppm, 10 ppm, 30 ppm, 50 ppm, 70 ppm, 80 ppm, 90 ppm, 100 ppm, 150 ppm, 250 ppm, or 500 ppm, to a high of 50 ppm, 60 ppm, 70 ppm, 80 ppm, 90 ppm, 100 ppm, 150 ppm, 250 ppm, 500 ppm, or 1000 ppm, including any combination of any low or high value recited herein, based on the weight of the fluidized bed.

The amount of the second polymerization neutralizer that is used may also be represented on a ppm by weight basis. For example, the amount may be between 5 ppm and 1000 ppm, based on the weight of the fluidized bed. The amount may range from a low of 5 ppm, 10 ppm, 30 ppm, 50 ppm, 70 ppm, 80 ppm, 90 ppm, 100 ppm, 150 ppm, 250 ppm, or 500 ppm, to a high of 50 ppm, 60 ppm, 70 ppm, 80 ppm, 90 ppm, 100 ppm, 150 ppm, 250 ppm, 500 ppm, or 1000 ppm, including any combination of any low or high value recited herein, based on the weight of the fluidized bed.

Polymerization neutralizer can be added to the reactor from any location or number of locations within the polymerization system. For example, polymerization neutralizer can be introduced directly to the reactor, with the reactor feed, the catalyst feed, to the cycle fluid, or any combination thereof. Preferably, polymerization neutralizer is introduced directly to the reactor and/or to the cycle fluid.

Suitable polymerization neutralizers for the first or second polymerization neutralizer can include, but are not limited to, one or more Lewis bases such as carbon monoxide, carbon dioxide, or any combination thereof. The first polymerization neutralizer can include carbon monoxide, carbon dioxide, or a combination thereof, but does not comprise water. The second polymerization neutralizer can include carbon monoxide, carbon dioxide, water, or a combination thereof. The second polymerization neutralizer preferably comprises water. For example, the second polymerization neutralizer can be just water or any combination of one or more Lewis bases that includes water. "Water" or "$H_2O$" herein refers to water in any physical state, including liquid and vapor.

The recovery of polymer product can be adjusted, i.e., reduced, increased and/or stopped, at any time before, after, or at the same time the first polymerization neutralizer is introduced to the reactor. For example, recovery of the polymer product can be stopped when the first polymerization neutralizer is introduced to the reactor. In another example, the polymer product can be stopped within about +/−1 minute, about +/−5 minutes, or about +/−10 minutes of the time the first polymerization neutralizer is introduced to the reactor.

The rate the reactor feed is introduced to the reactor can also be adjusted, i.e., reduced, increased and/or stopped, at any time before, after, or at the same time the polymerization neutralizer is introduced to the reactor. For example, introduction of the reactor feed can be stopped when the first polymerization neutralizer is introduced to the reactor. In another example, introduction of the reactor feed can be stopped within about +/−1 minute, about +/−5 minutes, or about +/−10 minutes of the time the first polymerization neutralizer is introduced to the reactor.

Each particular component of the reactor feed, e.g. monomer(s), induced condensing agents ("ICAs"), hydrogen, and/or inert gases such as nitrogen, can be stopped at the same time or at different times with respect to one another. For example, all components of the reactor feed can be stopped at the same time. In another example, for a reactor feed having monomer(s) and ICA(s), introduction of the ICA(s) can be stopped prior to introduction of the first polymerization neutralizer and introduction of the monomer(s) can be stopped when or after the first polymerization neutralizer is introduced to the reactor. In still another example, for a reactor feed having monomer(s) and ICA(s), both the ICA(s) and the monomer(s) can be stopped before the first polymerization neutralizer is introduced to the reactor and the introduction of the ICA(s) can be stopped before the introduction of the monomer(s) is stopped.

Further, the rate the catalyst feed is introduced to the reactor can be adjusted, i.e., reduced, increased and/or stopped, at any time before, after, or at the same time the first polymerization neutralizer is introduced to the reactor. For example, introduction of the catalyst feed can be stopped when the first polymerization neutralizer is introduced to the reactor. In another example, introduction of the catalyst feed can be stopped within about +/−1 minute, about +/−5 minutes, or about +/−10 minutes of the time the first polymerization neutralizer is introduced to the reactor.

Each particular component of the catalyst feed, e.g. catalyst(s), activator(s), and/or additives, can be stopped at the same time or different times with respect to one another. For example, all components of the catalyst feed can be stopped at the same time. In another example, for a catalyst feed having a first catalyst system and a second catalyst system, introduction of the first catalyst system can be stopped prior to introduction of the first polymerization neutralizer and introduction of the second catalyst system can be stopped when or after the first polymerization neutralizer is introduced to the reactor. In still another example, for a catalyst feed having a first catalyst system and a second catalyst system both the first and second catalyst systems can be stopped before the first polymerization neutralizer is introduced to the reactor and the introduction of the first catalyst system can be stopped before introduction of the second catalyst system is stopped.

As noted above, the methods herein can include idling the reactor for a period. As part of the idling procedure, the pressure within the reactor can be adjusted. The pressure within the reactor can be adjusted by removing at least a portion of the gases and/or liquids from within the reactor or adding gases and/or liquids to the reactor. For example, the pressure within the reactor can be reduced by venting or purging at least a portion of the gases and/or liquids from within the reactor.

The idling pressure can be less than or greater than the operating pressure. Preferably, the idling pressure is less than the operating pressure. For example, the normal operating pressure within the reactor can range from a low of about 1,000 kPag, about 1,200 kPag, about 1,400 kPag, or about 1,500 kPag to a high of about 1,800 kPag, about 2,200 kPa, about 2,300 kPag, about 2,400 kPag, or about 2,500 kPag. During idling, however, the pressure can be reduced to a range having a low of about 500 kPag, about 600 kPag, about 700 kPag, about 800 kPag, about 900 kPag, or about 1,000 kPag to a high of about 600 kPag, about 700 kPag, about 800 kPag, about 900 kPag, about 1,100 kPag, about 1,200 kPag, or about 1,300 kPag, or any combination of any upper or lower limit recited herein. The pressure within the reactor can be reduced by venting or purging at least a portion of the gases and/or liquids within the reactor before, when, or after the polymerization neutralizer is introduced to the reactor.

If the pressure within the reactor approaches or falls below a desired idling pressure, gases and/or liquids can be introduced to the reactor to increase the pressure therein. For example, nitrogen can be introduced to the reactor to increase the pressure within the reactor to a desired idling pressure. The idling pressure can be less than the operating pressure, equal to the operating pressure, or greater than the operating pressure of the reactor.

Optionally, the idling procedure can also include adjusting the superficial velocity of cycle fluid flowing through the reactor can be adjusted from an operating superficial velocity to an idling superficial velocity. The pressure drop through the fluidized bed is equal to or slightly greater than the weight of the fluidized bed divided by the cross-sectional area. It is thus dependent on the geometry of the reactor. To maintain a viable fluidized bed in the reactor, the superficial gas velocity through the bed must exceed the minimum flow required for fluidization. During operating conditions, preferably the superficial gas velocity is at least two times the minimum flow velocity. The operating superficial gas velocity can range from a low of about 0.3 m/s, about 0.35 m/s, about 0.4 m/s, or about 0.5 m/s to a high of about 1 m/s, about 1.4 m/s, about 1.8 m/s, or about 2 m/s. Ordinarily, the superficial gas velocity does not exceed 1.5 m/s and usually no more than about 0.8 m/s.

The idling superficial velocity can be less than the operating superficial velocity. For example, a reactor with an operating superficial velocity of around 0.8 m/s of cycle fluid flow therethrough can be reduced to about 0.60 to about 0.70 m/s or about 0.60 to about 0.65 m/s during idling. The superficial velocity can be reduced before, after, and/or at the same time the first polymerization neutralizer is introduced to the reactor.

The use of lower superficial gas velocity during the idling procedure can aid in decreasing catalyst entrainment static during idling. Small changes in the superficial gas velocity can result in large changes in entrainment static. Thus, reducing or lowering the superficial gas velocity during the idling or start up procedures can decrease the entrainment static. Reductions in the entrainment static can lead to reductions in sheeting and fouling in the reactor. The level of static in the reactor can be measured using a static probe, as described in PCT Publication WO 2008/016478. For example, the level of static in the reactor may be measured using an upper static probe located near the top of the fluidized bed. This upper static probe may provide a measurement of entrainment static, the static at or near the top of the fluidized bed or near the reactor output streams.

Optionally, the temperature within the reactor can be adjusted during the transition. The temperature within the reactor can be reduced, before, after, and/or at the same time the first polymerization neutralizer is introduced to the reactor. The idling temperature of the fluidized bed can be about 85° C. or less, about 83° C. or less, about 80° C. or less, or about 77° C. or less. The idling temperature of the fluidized bed can be maintained at a temperature that can range from about ambient or "room" temperature to about 79° C., about 82° C., or about 84° C. Reducing or stopping the polymerization within the reactor can reduce or eliminate the heat produced therefrom, which can reduce the temperature within the reactor. The temperature within the reactor can also be reduced and/or maintained by adjusting the temperature of a heat transfer medium used to adjust the temperature of the cycle fluid, for example.

It is advantageous to ensure that the dew point temperature of the gas composition within the reactor is at least about 3° C. less than the fluidized bed temperature prior to introducing the first polymerization neutralizer. Allowing the fluidized bed temperature to approach too closely to the dew point temperature of the gas composition during a catalyst transition can also lead to sheeting, fouling, and the like. For example, the dew point temperature of the gas composition within the reactor may be at least about 5° C., 10° C., 15° C., 20° C., or even 25° C. or more less than the fluidized bed temperature. This temperature differential may be maintained for the entire transition or, for example, through the step of purging the reactor with an inert gas or until the second catalyst system is introduced. During the step of purging the reactor with an inert gas, the fluidized bed temperature may advantageously be maintained at between 75° C. and 85° C., 78° C. and 84° C., 80° C. and 83° C., 81° C. and 83° C., or be maintained at about 82° C.

For reactors operating in condensed mode, it is also advantageous to ensure that the dew point temperature of the gas composition within the reactor is at least about 3° C., about 5° C., or about 10° C. or more greater than the reactor inlet temperature prior to introducing the first polymerization neutralizer. The reactor inlet temperature is typically measured at the bottom inlet of the reactor, under the distributor plate.

If the ambient temperature outside the reactor is cool, e.g. less than 25° C., the fluidized bed can tend to cool down below a desired idling temperature because of the reduced or lack of heat being generated within the reactor due to a reduced rate or termination of polymerization. To compensate for cooling of the fluidized bed, the temperature of the heat transfer medium can be increased. However, to avoid plate fouling and/or sheeting or other polymer accumulation within the reactor, the temperature of a heat transfer medium used to heat the cycle fluid introduced to the reactor can be monitored and controlled. The temperature of the heat transfer medium can be maintained at a temperature of less than about 95° C., less than about 91° C., less than about 89° C., less than about 85° C., less than about 81° C., less than about 78° C., or less than about 75° C. Increasing the heat transfer medium beyond about 80° C., about 85° C., about 90° C., or about 95° C. could lead to plate fouling or other sheeting within the reactor upon introduction of the cycle fluid thereto.

During normal operation, i.e. polymer production, under a given set of operating conditions the fluidized bed is maintained at essentially a constant height by withdrawing a portion of the bed as polymer product at the rate of formation of the particulate polymer product. Since the rate of heat generation during polymerization is directly related to the rate of product formation, a measurement of the temperature rise of the fluid across the reactor (the difference between inlet cycle fluid temperature and exit cycle fluid temperature) is indicative of the rate of particulate polymer formation at a constant fluid velocity if no or negligible vaporizable liquid is present in the inlet fluid. The temperature rise of the fluid across the reactor, i.e. the temperature of the cycle gas exiting the reactor minus the temperature of the cycle gas introduced to the reactor, can be referred to as "DT" or "ΔT." A normal or typical DT for the reactor during polymer production can range from a low of about 5° C., about 10° C., or about 15° C. to a high of about 40° C., about 50° C., or about 55° C.

During idling of the polymerization system, the DT of the reactor can range from a low of about −15° C., about −11° C., or about −8° C. to a high of about −4° C., about −2° C., or about 0° C. The particular DT can depend on the ambient temperature outside the reactor, the temperature of the heat transfer medium, the size of the particular reactor, or any combination thereof. In at least one example, the temperature within the reactor can be allowed to fall to the surrounding ambient temperature, i.e. heat exchangers used to cool the cycle fluid during operation and/or warm during idling can be bypassed or operated at ambient temperature.

The height of the fluidized bed during the transition or during idling of the reactor can vary. The height of the fluidized bed can be based, at least in part, on the particular polymer being produced in the reactor at the time the transition or idling procedure is initiated, the particular polymer to be produced next, or a combination thereof. Adjusting the rate of recovery of the polymer product can be performed in a manner that adjusts the height of the fluidized bed to a desired level. For example, the height of the fluidized bed can be increased by reducing or stopping the amount of polymer product recovered from the reactor while polymerization is continued, i.e. before the first polymerization neutralizer is introduced to the reactor. In another example, the height of the fluidized bed can be decreased by increasing the amount of polymer product recovered from the reactor, reducing the amount of polymerizable components introduced from the feed stream, or a combination thereof.

It can be desirable to have differing transition or idling fluidized bed heights depending on the particular polymer within the reactor. During normal operation the reactor can be operated such that the height of the fluidized bed ranges from a low of about −1 m, about 0 m, or about 0.2 m to a high of about 0.5 m, about 1 m, or about 1.5 m relative to the neck of the reactor. The "neck" refers to the junction or connection between a cylindrical section and a transition section of the reactor. During idling of the reactor the height of the fluidized bed can fall or decrease if, for example, the superficial velocity of the cycle fluid flowing through the fluidized bed is reduced. As such, it can also be desirable to raise or increase the fluidized bed height prior to introducing the first polymerization neutralizer. Prior to introducing the first polymerization neutralizer to the reactor and/or stopping the reactor feed and/or the catalyst feed the height of the fluidized bed can be adjusted to about 0 m, about 0.5 m, about 1 m, about 1.25 m, about 1.4 m, about 1.5 m, about 1.6 m, about 1.75 m, about 2 m, or about 2.5 m above the neck of the reactor, or to within a range of any upper or lower value recited herein.

The reactor can remain idle for any desired period of time, i.e. continued circulation of the gases therethrough to maintain a reduced or non-polymerizing fluidized bed therein. The period of time the reactor can be maintained at or in an idled state can range from a few minutes or hours to days or even weeks.

The reactor can also be circulated for a period of time during or after any step of the method. For example, the reactor may be circulated for at least 10 minutes, 15 minutes, 20 minutes, 30 minutes, 60 minutes, 120 minutes, or 150 minutes or more after introducing the first polymerization neutralizer. The reactor may also be circulated for at least 10 minutes, 15 minutes, 20 minutes, 30 minutes, 60 minutes, 120 minutes, or 150 minutes or more after introducing the second polymerization neutralizer.

Following introduction of the first and second polymerization neutralizer, and idling or circulating the reactor for a period if desired, the reactor is purged with an inert gas. The time required for this purge may be 1 hour or more, 2 hours or more, 3 hours or more, or 4 hours or more. The purge reduces the concentration of polymerization neutralizer within the reactor system. This reduction may be done until the amount of the first polymerization neutralizer comprises less than 500 ppm, 100 ppm, 50 ppm, 30 ppm, 20 ppm, 10 ppm, 5 ppm, or 1 ppm based on the weight of the fluidized bed. This reduction may also be done until the amount of the second polymerization neutralizer comprises less than 500 ppm, 100 ppm, 50 ppm, 30 ppm, 20 ppm, 10 ppm, 5 ppm, or 1 ppm based on the weight of the fluidized bed. The concentration of polymerization neutralizer can be reduced by venting a portion of the cycle gas from the reactor. Nitrogen or other inert gases can be introduced to the reactor to maintain a desired volume of cycle gas and pressure within the polymerization system. The reactor feed can also be introduced in addition to or in lieu of the inert gases. Additionally, prior to or during the restart procedure, the amount of hydrocarbon within the fluidized bed may be reduced to less than 20, less than 15, less than 10, less than 5, less than 4, less than 3, less than 2, or less than 1 mol % of the fluidized bed.

After the purge, a reactor restart procedure can be initiated. The restart procedure can include re-introducing the reactor feed, reintroducing the catalyst feed, adjusting the rate gases are removed from the reactor via the vent or purge line, adjusting the superficial velocity of the gases or cycle fluid through the reactor, adjusting the temperature of the heat transfer medium used to adjust the temperature of the cycle fluid, adjusting the pressure within the reactor, re-starting recovery of the polymer product, and/or adjusting the height of the fluidized bed within the reactor. The reintroduction of the catalyst and the reactor feed, the vent recovery rate, adjusting the temperature, pressure, and superficial gas velocity within the reactor, restarting polymer product recovery, adjusting the temperature of the heat transfer medium, and/or the height of the fluidized bed can occur in any order or sequence.

The order or sequence of re-starting the reactor can generally follow the order of reducing the concentration of polymerization neutralizer within the reactor, restarting the reactor feed, adjusting the height of the fluidized bed within the reactor, restarting the catalyst feed, and restarting polymer product recovery. The pressure can be adjusted during introduction of the reactor feed, e.g. as the reactor feed is introduced to the reactor the pressure therein can increase. If the introduction of the reactor feed alone is insufficient to increase the pressure to the desired pressure, nitrogen or other non-reactive gases can be added thereto. The temperature can be adjusted or maintained at a temperature of from about 80° C. to about 90° C., e.g. 85° C. for any desired period of time. When the catalyst is introduced to the reactor and the concentration of polymerization neutralizer has been sufficiently reduced polymerization can begin. The heat generated from the polymerization after restarting can increase the temperature within the reactor. To reduce or maintain a desired temperature within the reactor, the temperature of the heat transfer medium can be adjusted such that the cycle fluid has a desired temperature prior to introduction to the reactor.

The reactor feed can be reintroduced at a rate less than a normal operating rate, equal to the normal operating rate, or greater than the normal operating rate. The rates of various components of the reactor feed, e.g. monomer(s), ICA(s), and/or hydrogen can be reintroduced at varying rates. Reintroduction of each component in the reactor feed can begin at the same time or different times with respect to one another. For a reactor feed that includes ethylene, hexene, isopentane, and hydrogen, the reintroduction of each component can be started at different times. For example, reintroduction of the hexene can be started, which can be followed by the ethylene, which can be followed by the isopentane, which can then be followed by the hydrogen. In another example, the hexene, ethylene, and isopentane can all be introduced at about the same time, which can be followed by the reintroduction of hydrogen. In still another example, the introduction of hexene and ethylene can be started, which can be followed by the isopentane and they hydrogen.

The reintroduction of each component of the reactor feed can be continuous or intermittent. The reintroduction of one or more components of the reactor feed can be continuous and the reintroduction of one or more components of the reactor feed can be intermittent. Depending on the particular polymer being produced in the reactor, the particular amount and rate each component is reintroduced can vary during restart and operation of the polymerization system.

As the reactor feed and/or inert gases are reintroduced to the reactor, the pressure within the reactor can be increased to an operating pressure or a pressure intermediate the transition or idling pressure and the operating pressure. For example, if the transition or idling pressure ranges from about 600 kPag to about 800 kPag and the desired operating pressure ranges from about 2,000 kPag to about 2,400 kPag the pressure within the reactor can be increased to an intermediate pressure of from about 1,700 kPag to about 1,900 kPag by the reintroduction of the reactor feed and/or inerts. Once polymerization has restarted, i.e. after reintroduction of the catalyst feed and the reactor feed have been restarted and the concentration of the polymerization neutralizer has sufficiently been decreased, the rate of introducing the reactor feed can be adjusted to the desired operating rates. In another example, the rate of introduction for the reactor feed can be brought to desired operating rates rather than a rate intermediate idling and normal production.

The superficial velocity of the cycle gas through the reactor can be maintained at the transition or idling rate, adjusted to the operational rate, or adjusted to a rate intermediate the transition or idling rate and the operational rate. Gases or fluid from within the polymerization system can be removed via the vent to maintain a desired reactor pressure and/or to adjust the concentration of one or more components, e.g., monomer(s), ICA(s), hydrogen, and the like. Once the desired pressure and flow rates "restart rates" for each component of the reactor feed are reached the catalyst can be reintroduced to the reactor.

The rate of catalyst initially reintroduced to the reactor can be less than the normal operating rate. The initial rate of catalyst feed reintroduced can range from a low of about 15%, about 20% or about 25% to a high of about 35%, about 40%, or about 50% of the normal operating rate. For example, if catalyst were introduced at a rate of 10 kg/hr during normal operation, the amount of catalyst reintroduced upon restarting can be about 2.7 kg/hr, about 3 kg/hr, about 3.3 kg/hr, or about 3.7 kg/hr. Once polymerization ("light off") has begun within the reactor, the rate of catalyst introduction can be increased to normal operating rates. Preferably the rate of catalyst introduction increased over a period of time. For example, the rate of catalyst introduction can be increased over a period of time of about 0.5 hours, about 1 hour, about 2 hours, about 3 hours, about 4 hours, about 5 hours, or about 6 hours.

The height of the fluidized bed can be adjusted from a transition or idling height to a restart height that can be less than or greater than the transition or idling height. The particular height of the fluidized bed upon restart can depend, at least in part, on the particular polymer to be produced within the reactor once polymerization begins. For example, the height of the fluidized bed can be increased by introducing a polymer to the fluidized bed. If the reactor is idling and it is desired to increase the height of the fluidized bed, polymer granules, beads, flakes, or the like can be introduced to the reactor, thereby increasing the height of the fluidized bed. In another example, the height of the fluidized bed can be increased by delaying restart of polymer product recovery after polymerization has been restarted.

Once introduction of the catalyst has been restarted and polymerization has been restarted, polymer product recovery can be restarted. The rate of product recovery can be less than the normal operating rate and can increase as the amount of polymer production increases. The production of polymer product can increase as the rate of introducing the catalyst and the reactor feed increases. The production of polymer product can also be increased as the concentration of modifying gaseous and/or liquid components such as ICAs in the reactor feed increase within the reactor. Another way to adjust the height of the fluidized bed can be to delay recovery of the polymer product until the desired fluidized bed height is reached or to increase the rate of polymer product recovery if it is desired to decrease the height of the bed.

The time required to restart the reactor from idling to normal operating conditions can range from a low of about 1 hour, about 3 hours, about 5 hours, or about 7 hours to a high of about 10 hours, about 15 hours, about 20 hours, about 25 hours, or about 30 hours. During restart of the reactor, other typical or normal operating conditions and monitoring procedures can be ran under "modified" or "moderated" conditions or values for a period of time after polymerization is restarted. For example, if the polymerization system is operated in condensed mode, a common technique for monitoring the reactor can include monitoring a stickiness control parameter ("dMRT") such as a reduced melt initiation temperature or "dMIT" value, which can provide an estimate as to the degree of polymer stickiness within the reactor. Moderated startup or restart conditions can include operating the reactor at a dMIT of about 0° C. or a dMIT within about +/−1° C., about +/−1.5° C., or about +/−2° C. for a period of time when the normal dMIT ranges from about 5° C. to about 10° C. Another "modified" restart condition can include operating the polymerization system at a level or concentration of ICAs ranging from a low of about 8.5 mol %, about 9 mol %, or about 9.5 mol % to a high of about 10.5 mol %, about 11 mol %, or about 11.5 mol % when a desired normal level would be greater.

The reactor feed can include any polymerizable hydrocarbon of combination of hydrocarbons. For example, the reactor feed can be any olefin monomer including substituted and unsubstituted alkenes having two to 12 carbon atoms, such as ethylene, propylene, 1-butene, 1-pentene, 1-hexene, 1-heptene, 1-octene, 4-methylpent-1-ene, 1-decene, 1-dodecene, 1-hexadecene, and the like. The reactor feed can also include non-hydrocarbon gas(es) such as nitrogen and/or hydrogen. The reactor feed can enter the reactor at multiple and different locations. For example, monomers can be introduced into the fluidized bed in various ways including direct injection through a nozzle (not shown) into the fluidized bed. The polymer product can thus be a homopolymer or a copolymer, including a terpolymer, having one or more other monomeric units. For example, a polyethylene product could include at least one or more other olefin(s) and/or comonomer(s).

The reactor feed can also include the one or more modifying components such as one or more induced condensing agents ("ICAs"). Illustrative ICAs include, but are not limited to, propane, butane, isobutane, pentane, isopentane, hexane, isomers thereof, derivatives thereof, and combinations thereof. As discussed and described above, the ICAs can be introduced to provide a reactor feed to the reactor having an ICA concentration ranging from a low of about 1 mol %, about 5 mol %, or about 10 mol % to a high of about 25 mol %, about 35 mol %, or about 45 mol %. Typical concentrations of the ICAs can range from about 14 mol %, about 16 mol %, or about 18 mol % to a high of about 20 mol %, about 22 mol %, or about 24 mol %. The reactor feed can include other non-reactive gases such as nitrogen and/or argon. Further details regarding ICAs are described in U.S. Pat. Nos. 5,352,749; 5,405,922; 5,436,304; and 7,122,607; and WO Publication No. 2005/113615(A2).

The catalyst feed can include any metallocene or single-site catalyst, catalyst system, or combination of catalysts and/or catalyst systems. For example, at least one of or both of the first metallocene catalyst and the second metallocene catalyst may comprise a biscyclopentadienyl or a bisindenyl transition metal compound.

The term "catalyst system" includes at least one "catalyst component" and at least one "activator," alternately at least one co-catalyst. The catalyst system can also include other components, such as supports, and is not limited to the catalyst component and/or activator alone or in combination. The catalyst system can include any number of catalyst components in any combination as described, as well as any activator in any combination as described.

The term "catalyst component" includes any compound that, once appropriately activated, is capable of catalyzing the polymerization or oligomerization of olefins. Preferably, the catalyst component includes at least one Group 3 to Group 12 atom and optionally at least one leaving group bound thereto. The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

As used herein, in reference to Periodic Table "Groups" of Elements, the "new" numbering scheme for the Periodic Table Groups are used as in the CRC Handbook of Chemistry and Physics (David R. Lide, ed., CRC Press $81^{st}$ ed. 2000).

Suitable metallocene catalyst compounds can include, but are not limited to, metallocenes described in U.S. Pat. Nos. 7,179,876; 7,169,864; 7,157,531; 7,129,302; 6,995,109; 6,958,306; 6,884,748; 6,689,847; 5,026,798; 5,703,187; 5,747,406; 6,069,213; 7,244,795; 7,579,415; U.S. Patent Application Publication No. 2007/0055028; and WO Publications WO 97/22635; WO 00/699/22; WO 01/30860; WO 01/30861; WO 02/46246; WO 02/50088; WO 04/022230; WO 04/026921; and WO 06/019494.

As used herein, the terms "activator" refers to any compound or combination of compounds, supported or unsupported, which can activate a catalyst compound or component, such as by creating a cationic species of the catalyst component. For example, this can include the abstraction of at least one leaving group (the "X" group in the single site catalyst compounds described herein) from the metal center of the catalyst compound/component. Activators can include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization. Illustrative Lewis acids include, but are not limited to, aluminoxane (e.g., methylaluminoxane "MAO"), modified aluminoxane (e.g., modified methylaluminoxane "MMAO" and/or tetraisobutyldialuminoxane "TIBAO"), and alkylaluminum compounds. Ionizing activators (neutral or ionic) such as tri (n-butyl)ammonium tetrakis(pentafluorophenyl) boron may be also be used. Further, a trisperfluorophenyl boron metalloid precursor may be used. Any of those activators/precursors can be used alone or in combination with the others. There are a variety of methods for preparing aluminoxane and modified aluminoxanes known in the art.

The catalyst compositions can include a support material or carrier. As used herein, the terms "support" and "carrier" are used interchangeably and are any support material, including a porous support material, for example, talc, inorganic oxides, and inorganic chlorides. The catalyst component(s) and/or activator(s) can be deposited on, contacted with, vaporized with, bonded to, or incorporated within, adsorbed or absorbed in, or on, one or more supports or carriers. Other support materials can include resinous support materials such as polystyrene, functionalized or cross-linked organic supports, such as polystyrene divinyl benzene polyolefins or polymeric compounds, zeolites, clays, or any other organic or inorganic support material and the like, or mixtures thereof.

Inorganic oxides supports can include Group 2, 3, 4, 5, 13 or 14 metal oxides. The preferred supports include silica, which may or may not be dehydrated, fumed silica, alumina, silica-alumina and mixtures thereof. Other useful supports include magnesia, titania, zirconia, magnesium chloride, montmorillonite, phyllosilicate, zeolites, talc, clays, and the like. Also, combinations of these support materials may be used, for example, silica-chromium, silica-alumina, silica-titania and the like. Additional support materials may include those porous acrylic polymers described in EP 0 767 184, which is incorporated herein by reference.

The polymer product(s) produced in the reactor can be or include any type of polymer or polymeric material. For example, the polymer product can include homopolymers of olefins (e.g., homopolymers of ethylene), and/or copolymers, terpolymers, and the like of olefins, particularly ethylene, and at least one other olefin. Illustrative polymers can include, but are not limited to, polyolefins, polyamides, polyesters, polycarbonates, polysulfones, polyacetals, polylactones, acrylonitrile-butadiene-styrene polymers, polyphenylene oxide, polyphenylene sulfide, styrene-acrylonitrile polymers, styrene maleic anhydride, polyimides, aromatic polyketones, or mixtures of two or more of the above. Suitable polyolefins can include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, more preferably $C_3$ to $C_{10}$ alpha-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene and or butene.

Preferred polymers include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably, the polymers are or include homo polyethylene, homo polypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene ("VLDPE"), linear low density polyethylene ("LLDPE"), low density polyethylene ("LDPE"), medium density polyethylene ("MDPE"), high density polyethylene ("HDPE"), polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

Figure 1:
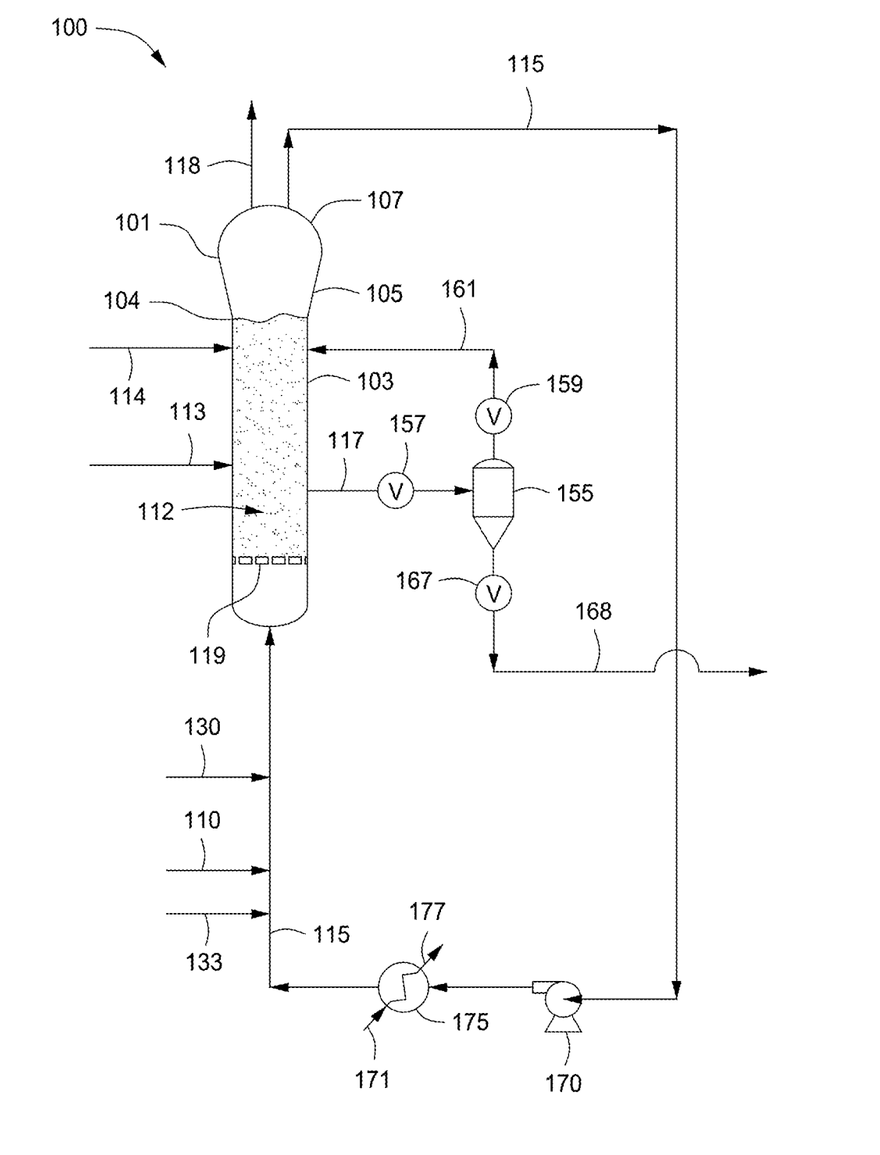
FIG. 1 depicts a schematic of an illustrative gas phase polymerization system for making polymers.

FIG. 1 depicts a flow diagram of an illustrative gas phase polymerization system 100 for making polymers, according to one or more embodiments. The polymerization system 100 can include a reactor 101 in fluid communication with one or more discharge tanks 155 (only one shown), compressors 170 (only one shown), and heat exchangers 175 (only one shown). The polymerization system 100 can also include more than one reactor 101 arranged in series, parallel, or configured independent from the other reactors, each reactor having its own associated discharge tanks 155, compressors 170, and heat exchangers 175, or alternatively, sharing any one or more of the associated discharge tanks 155, compressors 170, and heat exchangers 175. For simplicity and ease of description, the polymerization system 100 will be further described in the context of a single reactor train.

The reactor 101 can include a cylindrical section 103, a transition section 105, and a velocity reduction zone or dome 107. The cylindrical section 103 is disposed adjacent the transition section 105. The transition section 105 can expand from a first diameter that corresponds to the diameter of the cylindrical section 103 to a larger diameter adjacent the dome 107. As mentioned above, the location or junction at which the cylindrical section 103 connects to the transition section 105 is referred to as the "neck" or the "reactor neck" 104. The dome 107 has a bulbous shape. One or more cycle fluid lines 115 and vent lines 118 can be in fluid communication with the top head 107. The reactor 101 can include the fluidized bed 112 in fluid communication with the top head 107.

In general, the height to diameter ratio of the cylindrical section 103 can vary in the range of from about 2:1 to about 5:1. The range, of course, can vary to larger or smaller ratios and depends, at least in part, upon the desired production capacity and/or reactor dimensions. The cross-sectional area of the dome 107 is typically within the range of from about 2 to about 3 multiplied by the cross-sectional area of the cylindrical section 103.

The velocity reduction zone or dome 107 has a larger inner diameter than the fluidized bed 112. As the name suggests, the velocity reduction zone 107 slows the velocity of the gas due to the increased cross-sectional area. This reduction in gas velocity allows particles entrained in the upward moving gas to fall back into the bed, allowing primarily only gas to exit overhead of the reactor 101 through the cycle fluid line 115. The cycle fluid recovered via line 115 can contain less than about 10% wt, less than about 8% wt, less than about 5% wt, less than about 4% wt, less than about 3% wt, less than about 2% wt, less than about 1% wt, less than about 0.5% wt, or less than about 0.2% wt of the particles entrained in fluidized bed 112.

The reactor feed via line 110 can be introduced to the polymerization system 100 at any point. For example, the reactor feed via line 110 can be introduced to the cylindrical section 103, the transition section 105, the velocity reduction zone 107, to any point within the cycle fluid line 115, or any combination thereof. Preferably, the reactor feed 110 is introduced to the cycle fluid in line 115 before or after the heat exchanger 175. In the FIGURE, the reactor feed via line 110 is depicted entering the cycle fluid in line 115 after the heat exchanger 175. The catalyst feed via line 113 can be introduced to the polymerization system 100 at any point. Preferably the catalyst feed via line 113 is introduced to the fluidized bed 112 within the cylindrical section 103.

The cycle fluid via line 115 can be compressed in the compressor 170 and then passed through the heat exchanger 175 where heat can be exchanged between the cycle fluid and a heat transfer medium. For example, during normal operating conditions a cool or cold heat transfer medium via line 171 can be introduced to the heat exchanger 175 where heat can be transferred from the cycle fluid in line 115 to produce a heated heat transfer medium via line 177 and a cooled cycle fluid via line 115. In another example, during idling of the reactor 101 a warm or hot heat transfer medium via line 171 can be introduced to the heat exchanger 175 where heat can be transferred from the heat transfer medium to the cycle fluid in line 115 to produce a cooled heat transfer medium via line 117 and a heated cycle fluid via line 115. The terms "cool heat transfer medium" and "cold heat transfer medium" refer to a heat transfer medium having a temperature less than the fluidized bed 112 within the reactor 101. The terms "warm heat transfer medium" and "hot heat transfer medium" refer to a heat transfer medium having a temperature greater than the fluidized bed 112 within the reactor 101. The heat exchanger 175 can be used to cool the fluidized bed 112 or heat the fluidized bed 112 depending on the particular operating conditions of the polymerization system 100, e.g. start-up, normal operation, idling, and shut down. Illustrative heat transfer mediums can include, but are not limited to, water, air, glycols, or the like. It is also possible to locate the compressor 170 downstream from the heat exchanger 175 or at an intermediate point between several heat exchangers 175.

After cooling, all or a portion of the cycle fluid via line 115 can be returned to the reactor 101. The cooled cycle fluid in line 115 can absorb the heat of reaction generated by the polymerization reaction. The heat transfer medium in line 171 can be used to transfer heat to the cycle fluid in line 115 thereby introducing heat to the polymerization system 100 rather than removing heat therefrom. The heat exchanger 175 can be of any type of heat exchanger. Illustrative heat exchangers can include, but are not limited to, shell and tube, plate and frame, U-tube, and the like. For example, the heat exchanger 175 can be a shell and tube heat exchanger where the cycle fluid via line 115 can be introduced to the tube side and the heat transfer medium can be introduced to the shell side of the heat exchanger 175. If desired, several heat exchangers can be employed, in series, parallel, or a combination of series and parallel, to lower or increase the temperature of the cycle fluid in stages.

Preferably, the cycle gas via line 115 is returned to the reactor 101 and to the fluidized bed 112 through fluid distributor plate ("plate") 119. The plate 119 is preferably installed at the inlet to the reactor 101 to prevent polymer particles from settling out and agglomerating into a solid mass and to prevent liquid accumulation at the bottom of the reactor 101 as well to facilitate easy transitions between processes which contain liquid in the cycle stream 115 and those which do not and vice versa. Although not shown, the cycle gas via line 115 can be introduced into the reactor 101 through a deflector disposed or located intermediate an end of the reactor 101 and the distributor plate 119.

The catalyst feed via line 113 can be introduced to the fluidized bed 112 within the reactor 101 through one or more injection nozzles (not shown) in fluid communication with line 113. The catalyst feed is preferably introduced as pre-formed particles in one or more liquid carriers (i.e. a catalyst slurry). Suitable liquid carriers can include mineral oil and/or liquid or gaseous hydrocarbons including, but not limited to, propane, butane, isopentane, hexane, heptane octane, or mixtures thereof. A gas that is inert to the catalyst slurry such as, for example, nitrogen or argon can also be used to carry the catalyst slurry into the reactor 101. In one example, the catalyst can be a dry powder. In another example, the catalyst can be dissolved in a liquid carrier and introduced to the reactor 101 as a solution. The catalyst via line 113 can be introduced to the reactor 101 at a rate sufficient to maintain polymerization of the monomer(s) therein.

Fluid via line 161 can be separated from a polymer product recovered via line 117 from the reactor 101. The fluid can include unreacted monomer(s), hydrogen, ICA(s), and/or inerts. The separated fluid can be introduced to the reactor 101. The separated fluid can be introduced to the recycle line 115 (not shown). The separation of the fluid can be accomplished when fluid and product leave the reactor 101 and enter the product discharge tanks 155 (one is shown) through valve 157, which can be, for example, a ball valve designed to have minimum restriction to flow when opened. Positioned above and below the product discharge tank 155 can be conventional valves 159, 167. The valve 167 allows passage of product therethrough. For example, to discharge the polymer product from the reactor 101, valve 157 can be opened while valves 159, 167 are in a closed position. Product and fluid enter the product discharge tank 155. Valve 157 is closed and the product is allowed to settle in the product discharge tank 155. Valve 159 is then opened permitting fluid to flow via line 161 from the product discharge tank 155 to the reactor 101. Valve 159 can then be closed and valve 167 can be opened and any product in the product discharge tank 155 can flow into and be recovered via line 168. Valve 167 can then be closed. Although not shown, the product via line 168 can be introduced to a plurality of purge bins or separation units, in series, parallel, or a combination of series and parallel, to further separate gases and/or liquids from the product. The particular timing sequence of the valves 157, 159, 167, can be accomplished by use of conventional programmable controllers which are well known in the art.

Another preferred product discharge system which can be alternatively employed is that disclosed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The reactor 101 can be equipped with one or more vent lines 118 to allow venting the bed during start up, idling, and/or shut down. The reactor 101 can be free from the use of stirring and/or wall scraping. The cycle line 115 and the elements therein (compressor 170, heat exchanger 175) can be smooth surfaced and devoid of unnecessary obstructions so as not to impede the flow of cycle fluid or entrained particles.

The conditions for polymerizations vary depending upon the monomers, catalysts, catalyst systems, and equipment availability. The specific conditions are known or readily derivable by those skilled in the art. For example, the temperatures can be within the range of from about −10° C. to about 140° C., often about 15° C. to about 120° C., and more often about 70° C. to about 110° C. Pressures can be within the range of from about 10 kPag to about 10,000 kPag, such as about 500 kPag to about 5,000 kPag, or about 1,000 kPag to about 2,200 kPag, for example.

As discussed and described above, various systems and/or methods can be used to monitor and/or control the degree or level of fouling within the reactor 101. For example, if the polymerization system 100 is operated in condensed mode, a common technique for monitoring the polymerization can include monitoring a stickiness control parameter ("dMRT") such as a reduced melt initiation temperature or "dMIT" value, which can provide an estimate as to the degree of polymer stickiness within the reactor 101. Another method for monitoring polymerization can include estimating acoustic emissions within the reactor 101, which can also provide an estimate as to the degree of polymer stickiness within the reactor 101.

The recovery of the polymer product via line 117 and introduction of the reactor feed via line 110 and the catalyst feed via line 113 can be reduced or stopped before, after, or simultaneously with the introduction of polymerization neutralizer via line 130. For example, recovery of the polymer product via line 117 and introduction of the reactor feed via line 110 and the catalyst feed via line 113 can be stopped when the polymerization neutralizer via line 130 is introduced to the polymerization system 100.

The pressure within the reactor can be reduced from an operating pressure to an idling pressure by removing at least a portion of the gases within the reactor 101 (the "reactor gases") via line 118. In addition to removing at least a portion of the reactor gases via vent line 118, the amount of polymerizable and/or modifying gases can also be reduced. Should the pressure fall below a desired idling pressure or the pressure within the reactor 101 should be increased nitrogen or other inert gases via line 133 can be introduced thereto.

Prior to introducing polymerization neutralizer via line 130 to the reactor 101 the concentration of the polymerizable and/or modifying components within the reactor 101 such as monomers and/or ICAs can be reduced via the vent line 118, while polymerization continues within the reactor 101. The concentration of ICAs within the reactor can be reduced via vent line 118 to a concentration intermediate an idling concentration and a normal operating concentration via vent line 118.

The superficial velocity of the cycle fluid introduced via line 115 to the reactor 101 can be adjusted from an operational superficial velocity to an idling superficial velocity by controlling the rate of introduction to the reactor 101. For example, the flow rate of the cycle fluid in line 115 can be reduced via one or more valves (not shown) to provide a cycle fluid flow through the reactor 101 at a reduced superficial velocity.

After the polymerization neutralizer via line 130 has been introduced to the reactor 101 and introduction of the reactor feed via line 110, the catalyst feed via line 113 have been reduced or stopped and the pressure and superficial velocity have been adjusted from to an idling pressure and superficial velocity, the reactor 101 can be maintained at these conditions for a period of time. After the period of time, a reactor restart procedure can be initiated.

During idling of the reactor 101, the concentration of the polymerization neutralizer introduced via line 130 can be monitored. Should the concentration fall below a desired idling concentration then additional polymerization neutralizer via line 130 can be introduced to the reactor 101. The concentration of the polymerization neutralizer can be monitored via one or more gas chromatographs or other detection equipment in a lab or in fluid communication with the polymerization system.

The restart procedure can also include adjusting the height of the fluidized bed 112 from an idling height to a restart height. The restart height of the fluidized bed 112 can be greater than or less than the height of the fluidized bed during idling. To increase the height of the fluidized bed 112 polymer granules, beads, flakes, or the like can be introduced via line 114 to the reactor 101, thereby increasing the height of the fluidized bed 112. To decrease the height of the fluidized bed 112 polymer product can be removed via line 117.

The concentration of polymerization neutralizer within the reactor 101 can be reduced via vent line 118. The reactor feed via line 110 can be increased or restarted before, after, or during the reduction in the concentration of the polymerization neutralizer. The reactor feed via line 110 can include the same polymerizable and/or modifying components as before initiation of the reactor idling procedure or the reactor feed via line 110 can include different polymerizable and/or modifying components. The pressure within the reactor 101 can be adjusted from the idling pressure to the operating pressure or a pressure intermediate the idling pressure and the operating pressure. For example, the pressure within the reactor 101 can be increased by introducing the reactor feed via line 110 and/or inert gases via line 133. In another example, the pressure within the reactor 101 can be decreased by removing reactor gases via vent line 118. The superficial velocity of the reactor gases through the reactor 101 can be adjusted from the idling superficial velocity to the operating superficial velocity or a superficial velocity intermediate the idling superficial velocity and the operating superficial velocity.

Polymerization within the reactor can be restarted once the concentration of the polymerization neutralizer has been reduced a sufficient amount. Increasing or restarting introduction of the catalyst feed via line 113 can increase the polymerization within the reactor. The catalyst feed via line 113 can be the same catalyst feed or a different catalyst feed than was introduced to the reactor 101 prior to initiating the reactor idling procedure.

The recovery of the polymer product via line 117 can be increased or restarted before, when, or after polymerization is restarted within the reactor 101. The recovery of the polymer product via line 117 can be restarted at a normal operating recovery rate for the desired polymer being produced within the reactor or to a product recovery rate intermediate the normal operating recovery rate and the idling recovery rate.

The temperature within the reactor 101 can be adjusted from an idling temperature to an operating temperature as introduction of the reactor feed via line 110 and the catalyst feed via line 113 is restarted and polymerization is restarted within the reactor. The temperature of the cycle fluid in line 115 can be adjusted via the heat exchanger 175 to provide a cycle gas at a desired temperature. The temperature of the reactor 101 can be adjusted to a normal operating temperature for the polymer product being produced within the reactor 101 or the temperature can be adjusted to a temperature intermediate the normal operating temperature and the idling temperature.

EXAMPLES

To provide a better understanding of the foregoing discussion, the following non-limiting examples are provided. Although the examples are directed to specific embodiments, they are not to be viewed as limiting the invention in any specific respect. All parts, proportions and percentages are by weight unless otherwise indicated.

MI ($I_2$) can be measured in accordance with ASTM D-1238-E (at 190° C., 2.16 kg weight). Density can be measured according to ASTM D-105.

The following example illustrates an experimental closed reactor transition procedure carried out in a commercial scale gas phase fluidized bed polyethylene reactor. The polymerization reactor had a cylindrical section 103, a transition section 105, and a velocity reduction section 107, according to one or more embodiments discussed and described herein with reference to FIG. 1.

Prior to starting the transition, the reactor was operating in condensed mode using XCAT™ HP-100 Catalyst, a biscyclopentadienyl zirconium-based metallocene catalyst available from Univation Technologies. Before introducing any polymerization neutralizer the superficial gas velocity within the reactor was reduced to about 0.70 m/s, the bed level was allowed to increase to about 1.4 meters above the neck of the reactor, and then the catalyst feed was stopped.

It was ensured that the dew point temperature of the gas composition within the reactor was at least 3° C. less than the fluidized bed temperature and at least 3° C. greater than the reactor inlet temperature. Following this, CO was injected into the reactor at an amount of between about 60-100 ppmw, based on the weight of the fluidized bed, and the feed streams of monomer, comonomer, condensing agent, and hydrogen to the reactor were stopped. The reactor was allowed to circulate for about 30 minutes to ensure good contact between the CO and the catalyst. Next, $H_2O$ was injected into the reactor at an amount of between about 80-150 ppmw, based on the weight of the fluidized bed, and the reactor was again circulated for about 1 hour. The bed level decreased to slightly below the neck of the reactor.

A nitrogen purge was introduced into the reactor. The purge was continued for about 4 hours, maintaining a bed temperature of between about 82° C. and 85° C. and pressure of about 8.6 kg/cm². The superficial gas velocity within the reactor was maintained at between about 0.61 to 0.64 m/s while purging, and the purge was done until the residual amount of CO was less than 5 ppm, the residual amount of $H_2O$ was less than 10 ppm, and the residual amount of hydrocarbons was less than about 2 mol %.

Concentrations of monomer, comonomer, condensing agent, and hydrogen were then increased to appropriate levels, until the total pressure within the fluidized bed was between about 17 and 19.5 kg/cm² and the partial pressure of ethylene monomer was around 1.10 kg/cm². The bed level was allowed to increase slightly to between about 0 to 1 m above the neck of the reactor. The new catalyst, XCAT™ EZ-100 Catalyst, a bisindenyl zirconium-based metallocene catalyst available from Univation Technologies, was then introduced to the reactor at a feed rate of about 60% the targeted steady state feed rate. The target superficial gas velocity during introduction of the new catalyst was about 0.68 to 0.72 m/s. It was observed that the polyethylene reaction started again within about 1 hour of introducing the XCAT™ EZ-100 Catalyst feed. In total, the entire transition was completed in about 14 hours. The transition did not result in any observable degree of sheeting or fouling within the reactor, and there was no drop in pressure observed across the distributor plate of the reactor on start-up or on reaching steady state.

All numerical values are "about" or "approximately" the indicated value, and take into account experimental error and variations that would be expected by a person having ordinary skill in the art.

All documents cited herein are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for transitioning a gas phase polymerization reactor comprising a fluidized bed from a first metallocene catalyst to a second metallocene catalyst, the method comprising:
   reducing the superficial gas velocity within the reactor;
   increasing the height of the fluidized bed within the reactor;
   stopping a feed comprising the first metallocene catalyst;
   introducing a first polymerization neutralizer to the reactor, wherein the first polymerization neutralizer does not comprise $H_2O$;
   introducing a second polymerization neutralizer to the reactor, wherein the second polymerization neutralizer is different from the first polymerization neutralizer;
   purging the reactor with an inert gas; and
   introducing a feed comprising the second metallocene catalyst to the reactor.

2. The method of claim 1, wherein said first polymerization neutralizer comprises CO, $CO_2$, or a mixture thereof.

3. The method of claim 1, wherein said second polymerization neutralizer comprises $H_2O$.

4. The method of claim 1, wherein the amount of said first polymerization neutralizer is between 5 ppm and 500 ppm based on the weight of the fluidized bed.

5. The method of claim 1, wherein the amount of said second polymerization neutralizer is between 5 ppm and 500 ppm based on the weight of the fluidized bed.

6. The method of claim 1, wherein the dew point temperature of the gas composition within the reactor is at least about 3° C. less than the fluidized bed temperature while said first polymerization neutralizer is introduced.

7. The method of claim 1, wherein the dew point temperature of the gas composition within the reactor is at least about 5° C. less than the fluidized bed temperature while said first polymerization neutralizer is introduced.

8. The method of claim 1, wherein the dew point temperature of the gas composition within the reactor is at least about 3° C. or more greater than the reactor inlet temperature prior to introducing the first polymerization neutralizer.

9. The method of claim 1, wherein the reactor is circulated for at least 10 minutes after introducing said first polymerization neutralizer.

10. The method of claim 1, wherein the reactor is circulated for at least 30 minutes after introducing said second polymerization neutralizer.

11. The method of claim 1, wherein said increasing of the height of the fluidized bed includes increasing the height to a level at least 1 meter above the neck of the reactor.

12. The method of claim 1, wherein the height of the fluidized bed is decreased prior to introducing the feed comprising the second metallocene catalyst.

13. The method of claim 1, wherein the fluidized bed temperature is maintained at between 81° C. and 85° C. during said purge with an inert gas.

14. The method of claim 1, wherein said purge with an inert gas is done until hydrocarbons comprise less than 5 mol % of the fluidized bed.

15. The method of claim 1, wherein said purge with an inert gas reduces the amount of said first polymerization neutralizer until it comprises less than 10 ppm based on the weight of the fluidized bed.

16. The method of claim 1, wherein said purge with an inert gas reduces the amount of said second polymerization neutralizer until it comprises less than 30 ppm based on the weight of the fluidized bed.

17. The method of claim 1, wherein the fluidized bed is pretreated with a continuity additive prior to introducing said feed comprising the second metallocene catalyst, at an amount of between 10 ppm and 300 ppm continuity additive based on the weight of the fluidized bed.

18. The method of claim 1, wherein the time between stopping said feed comprising the first metallocene catalyst to introducing said feed comprising the second metallocene catalyst is 14 hours or less.

19. The method of claim 1, wherein said reducing of the superficial gas velocity includes reducing the superficial gas velocity to between 0.60 and 0.70 m/s.

20. The method of claim 1, wherein at least one of the first metallocene catalyst and the second metallocene catalyst comprises a biscyclopentadienyl or a bisindenyl transition metal compound.

* * * * *